United States Patent
Kondo et al.

(10) Patent No.: US 12,444,730 B2
(45) Date of Patent: Oct. 14, 2025

(54) ELECTRODE FOR SECONDARY BATTERY AND METHOD FOR PRODUCING THE SAME

(71) Applicant: Panasonic Intellectual Property Management Co., Ltd., Osaka (JP)

(72) Inventors: Shinichiro Kondo, Osaka (JP); Reiko Izumi, Osaka (JP); Daisuke Katou, Kyoto (JP); Takuya Jin, Osaka (JP); Yosuke Takayama, Osaka (JP); Masateru Mikami, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 535 days.

(21) Appl. No.: 17/909,475

(22) PCT Filed: Jan. 19, 2021

(86) PCT No.: PCT/JP2021/001565
§ 371 (c)(1),
(2) Date: Sep. 6, 2022

(87) PCT Pub. No.: WO2021/181888
PCT Pub. Date: Sep. 16, 2021

(65) Prior Publication Data
US 2023/0299261 A1    Sep. 21, 2023

(30) Foreign Application Priority Data
Mar. 11, 2020  (JP) ................ 2020-041978

(51) Int. Cl.
| | |
|---|---|
| H01M 4/13 | (2010.01) |
| H01M 4/04 | (2006.01) |
| H01M 4/139 | (2010.01) |
| H01M 4/62 | (2006.01) |
| H01M 4/66 | (2006.01) |

(52) U.S. Cl.
CPC ........... *H01M 4/13* (2013.01); *H01M 4/0404* (2013.01); *H01M 4/043* (2013.01);
(Continued)

(58) Field of Classification Search
CPC ...... H01M 4/13; H01M 4/0404; H01M 4/043; H01M 4/0435; H01M 4/0471;
(Continued)

(56) References Cited

U.S. PATENT DOCUMENTS

| | | | |
|---|---|---|---|
| 2005/0186473 A1 | 8/2005 | Mitchell et al. | |
| 2011/0244325 A1 | 10/2011 | Muraoka et al. | |

(Continued)

FOREIGN PATENT DOCUMENTS

| | | |
|---|---|---|
| CN | 103198929 B | 12/2016 |
| JP | 2001-216957 A | 8/2001 |
| JP | 2005-340071 A | 12/2005 |
| JP | 2013-65478 A | 4/2013 |

(Continued)

OTHER PUBLICATIONS

Extended (Supplementary) European Search Report dated Jun. 28, 2024, issued in counterpart EP Application No. 21767205.4. (8 pages).
(Continued)

*Primary Examiner* — Eugenia Wang
(74) *Attorney, Agent, or Firm* — WHDA, LLP

(57) ABSTRACT

This secondary battery electrode is provided with a core material configured from a metal foil that softens at less than or equal to 200° C., and an electrode mixture sheet which is bonded on the surface of the core material. The electrode mixture sheet includes an active material and a fibrous binder, and the active material bites into the core material, with the maximum bite depth at least 30% of the thickness of the core material. The fibrous binder may for example have polytetrafluoroethylene as the main component.

4 Claims, 2 Drawing Sheets

(52) U.S. Cl.
CPC ....... *H01M 4/0435* (2013.01); *H01M 4/0471* (2013.01); *H01M 4/139* (2013.01); *H01M 4/622* (2013.01); *H01M 4/623* (2013.01); *H01M 4/661* (2013.01); *H01M 4/662* (2013.01)

(58) Field of Classification Search
CPC ...... H01M 4/139; H01M 4/622; H01M 4/623; H01M 4/661; H01M 4/662; H01M 4/62; H01M 4/62102; H01M 4/625; H01M 4/66; H01M 2004/021; H01M 10/0525; H01M 10/052; Y02E 10/60
See application file for complete search history.

(56) References Cited

U.S. PATENT DOCUMENTS

| | | |
|---|---|---|
| 2014/0342225 A1 | 11/2014 | Isshiki et al. |
| 2015/0303481 A1 | 10/2015 | Duong et al. |

FOREIGN PATENT DOCUMENTS

| | | |
|---|---|---|
| JP | 2013-77560 A | 4/2013 |
| JP | 2017-517862 A | 6/2017 |
| JP | 2017-139435 A | 8/2017 |
| WO | 2011/001636 A1 | 1/2011 |

OTHER PUBLICATIONS

International Search Report dated Apr. 6, 2021, issued in counterpart International Application No. PCT/JP2021/001565 (3 pages).
Office Action dated Mar. 18, 2025, issued in counterpart JP Application No. 2022-505806, with English translation. (8 pages).

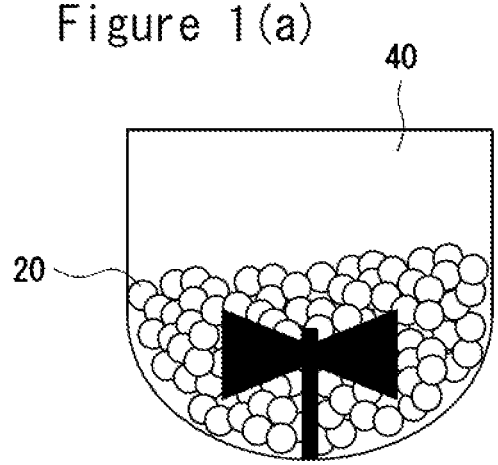
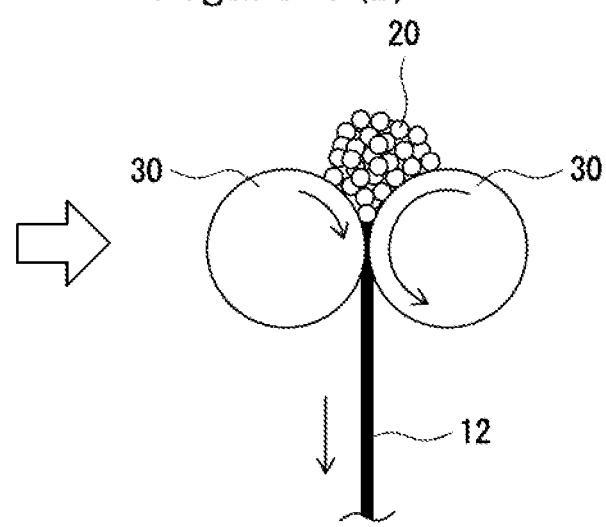
Figure 1(a)    Figure 1(b)
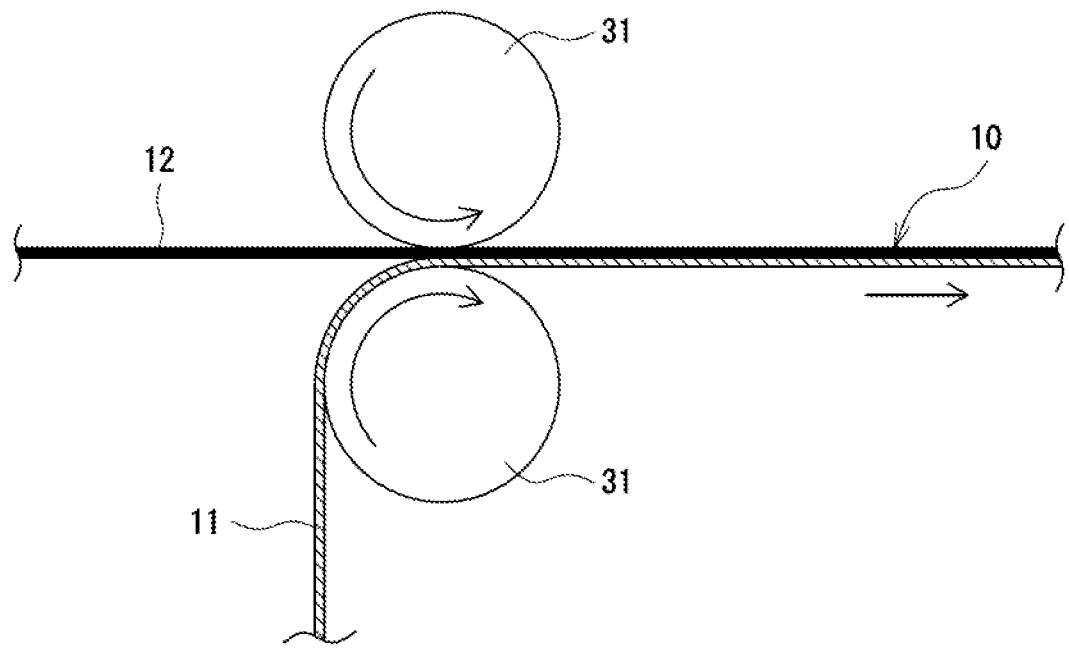
Figure 2

ELECTRODE FOR SECONDARY BATTERY AND METHOD FOR PRODUCING THE SAME

CROSS-REFERENCE TO RELATED APPLICATION

This application is a National Phase Application filed under 35 U.S.C. § 371 of International Application No. PCT/JP2021/001565 filed on Jan. 19, 2021 which claims the benefit of priority under 35 U.S.C. § 119(a) of Japanese Patent Application No. 2020-041978 filed in Japan on Mar. 11, 2020, the contents of which are incorporated herein by reference.

TECHNICAL FIELD

The present disclosure generally relates to an electrode for a secondary battery and a method of manufacturing the same, and particularly to an electrode preferable for a non-aqueous electrolyte secondary battery such as a lithium-ion battery and a method of manufacturing the same.

BACKGROUND ART

An electrode of a non-aqueous electrolyte secondary battery such as a lithium-ion battery is typically manufactured with a wet method in which an electrode mixture slurry including an active material, a binder, and the like is applied onto a surface of a core being a metal foil. In this case, a drying step of evaporating and removing a solvent included in the coating film is required, and another problem is that migration, the travelling of the binder during drying of the coating film, easily occurs. The binder migration increases the amount of the binder on the surface side compared with the core side of the coating film (electrode mixture layer), leading to uneven distribution of the binder in the thickness direction of the electrode mixture layer.

Proposed in recent years is a dry method including rolling an electrode mixture and forming into a sheet to produce an electrode mixture sheet and laminating the sheet onto a core to manufacture an electrode (for example, see Patent Literature 1). Here, Patent Literature 1 describes use of a composite particle powder containing an electrode active material and a binder in manufacturing the electrode mixture sheet. In Patent Literature 1, a fluidized-bed granulating method and a spray-drying granulating method are listed as a method of obtaining the composite particle powder. In both methods, predetermined raw materials are dispersed or dissolved in a solvent to produce a slurry, this slurry is dried to produce the composite particle powder, and the composite particle powder is compressed to form a compressed powder layer.

Patent Literature 2 discloses a method of manufacturing an electrode with a dry method, including using, as a binder, a hot-melt resin that is solid at ordinary temperature, softens when heated, and solidifies again when cooled, in order to achieve joining between an electrode mixture and a core.

CITATION LIST

Patent Literature

PATENT LITERATURE 1: Japanese Unexamined Patent Application Publication No. 2013-77560 PATENT LITERATURE 2: Japanese Unexamined Patent Application Publication No. 2013-65478

SUMMARY

When a slurry including a binder is used in producing an electrode, a powdery binder is dissolved in a solvent of the slurry to allow the binder to exhibit a binding property, resulting in achievement of adhesiveness by the binder in a mixture layer and between the mixture layer and the core. However, the solvent is required to be dried from the slurry, and thus labor saving in the step and equipment are difficult. Both of the fluidized-bed granulating method and the spray-drying granulating method disclosed in Patent Literature 1 require drying the solvent from the slurry.

Meanwhile, in manufacturing an electrode with the dry method without a solvent, strong joining of the electrode mixture sheet to the core is not easy, and for example, a problem is that peeling of the electrode mixture sheet easily occurs. This is because the method does not use a slurry including a binder and can not utilize adhesiveness obtained by dissolving the binder in a solvent. In the technique in Patent Literature 2, an electrode plate penetration resistance is considered to increase largely since the melted hot-melt resin widely covers a particle surface of the active material.

An electrode for a secondary battery according to the present disclosure comprises: a core constituted with a metal foil that softens at 200° C. or lower; and an electrode mixture sheet joined to a surface of the core, wherein the electrode mixture sheet includes an active material and a fibrous binder, and the active material is embedded in the core and a maximum embedded depth is 30% or more of a thickness of the core.

A method of manufacturing an electrode for a secondary battery according to the present disclosure comprises: mixing an active material and a fibrous binder without a solvent to produce an electrode mixture having a solid content concentration of substantially 100%; rolling the electrode mixture and forming into a sheet to produce an electrode mixture sheet; and disposing the electrode mixture sheet on a surface of a core constituted with a metal foil that softens at 200° C. or lower, and heat-pressing a stacked body of the electrode mixture sheet and the core at a temperature equal to or lower than a melting point of the fibrous binder.

An aspect of the present disclosure may provide an electrode for a secondary battery having a low electrode plate penetration resistance and a high peeling strength of the electrode mixture sheet.

BRIEF DESCRIPTION OF DRAWINGS

FIG. 1(a) and FIG. 1(b) are a view illustrating a step of manufacturing an electrode of an example of an embodiment.

FIG. 2 is a view illustrating a step of manufacturing an electrode of an example of an embodiment.

DESCRIPTION OF EMBODIMENTS

Figure 3:
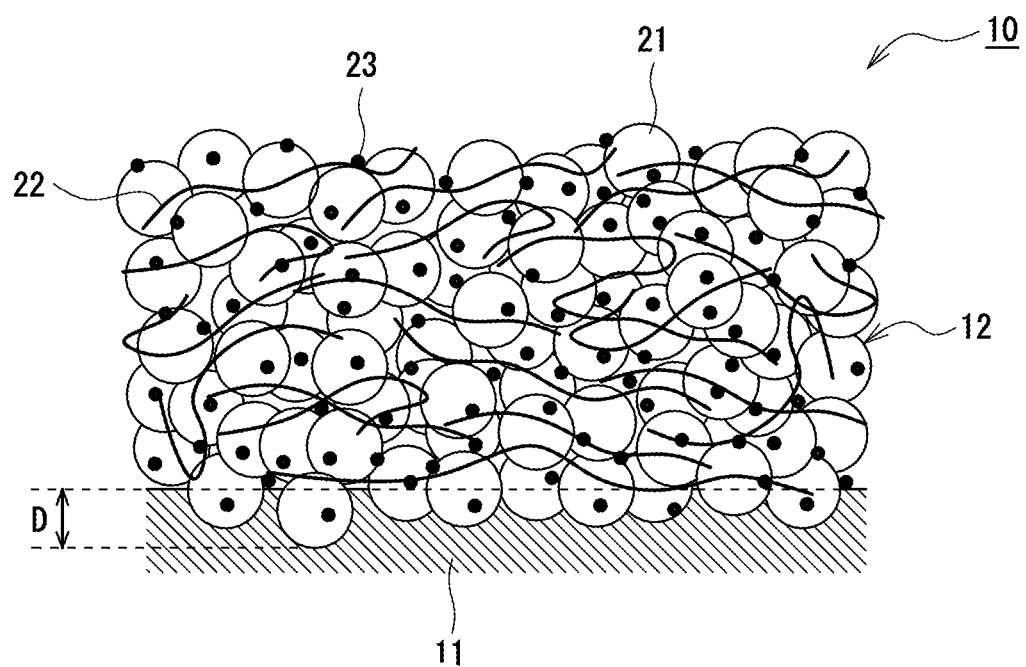
FIG. 3 is a cross-sectional view of an electrode of an example of an embodiment.

Hereinafter, embodiments of an electrode for a secondary battery according to the present disclosure and a method of manufacturing the same will be described in detail. Embodiments described below is merely an example, and the present disclosure is not limited to the following embodiments. The drawings referred to in the description of embodiments are schematically illustrated, and a size ratio and the like of constituents illustrated in the drawings should be determined with considering the following description.

Although the electrode for a secondary battery according to the present disclosure is preferable for a non-aqueous electrolyte secondary battery such as a lithium-ion battery, it may be applied to an aqueous battery including an aqueous electrolyte. Hereinafter, a positive electrode for a non-aqueous electrolyte secondary battery will be exemplified to make a description.

FIG. 1(a). FIG. 1(b) and FIG. 2 are views schematically illustrating a step of manufacturing a positive electrode 10 of an example of an embodiment, and FIG. 3 is a cross-sectional view of the positive electrode 10. As illustrated in FIG. 1(a), in the step of manufacturing the positive electrode 10, a positive electrode active material 21 (see FIG. 3) and a binder are dry-mixed without a solvent to produce a positive electrode mixture 20 having a solid content concentration of substantially 100%. The dry mix is a method in which particles of the positive electrode active material 21 and particles of the binder are mixed without a solvent in a state of the solid content concentration being substantially 100% with the positive electrode active material and the binder. During the dry mix, a conductive agent and the like may be added in addition to the positive electrode active material and the binder. Even when a material is added in addition to the positive electrode active material and the binder, the solid content concentration during the dry mix is substantially 100%. The positive electrode mixture 20 obtained with the dry mix includes the positive electrode active material 21 and a fibrous binder 22 (see FIG. 3).

Then, as illustrated in FIG. 1(b), the positive electrode mixture 20 is rolled and formed into a sheet to produce a positive electrode mixture sheet 12. Thereafter, as illustrated in FIG. 2, the positive electrode mixture sheet 12 is disposed on a surface of a core 11, and a stacked body of the core 11 and the positive electrode mixture sheet 12 is heat-pressed at a temperature that is equal to or lower than a melting point of the fibrous binder 22. By the above steps, a positive electrode 10 in which the positive electrode mixture sheet 12 is joined to the surface of the core 11 is manufactured. In the positive electrode mixture sheet 12, the fibrous binder 22 present in a mesh shape holds the positive electrode active material 21. The joining between the positive electrode mixture sheet 12 and the core 11 can be achieved with an anchor effect of the core 11 to the positive electrode mixture sheet 12, not with melting the fibrous binder 22.

In the step of manufacturing the positive electrode 10, a shear force is preferably applied to the binder particles for fibrillation to obtain the fibrous binder 22.

[Positive Electrode]

As illustrated in FIG. 3, the positive electrode 10 comprises: the core 11; and the positive electrode mixture sheet 12 joined to the surface of the core 11. The positive electrode mixture sheet 12 is preferably provided on both the surfaces of the core 11. The positive electrode mixture sheet 12 includes the fibrous binder 22 as the binder. The positive electrode 10 may be a long electrode plate constituting a wound-type electrode assembly, and may be a rectangular electrode plate constituting a stacked-type electrode assembly. The positive electrode 10 is manufactured by laminating the positive electrode mixture sheet 12 onto the core 11 to be cut in a predetermined shape and size.

For the core 11, a metal foil that softens at 200° C. or lower is used. When a core that does not soften at 200° C. or lower is used, it is difficult to achieve both of a low electrode plate penetration resistance and a high peeling strength. The core 11 that softens at 200° C. or lower herein means a core that allows metal particles to grow with rise in temperature, and means a core whose elongation rate when heated at 170° C. is doubled with respect to an elongation rate at ordinary temperature, and whose tensile strength when heated at 170° C. is 80% or less of a tensile strength at ordinary temperature.

The metal foil constituting the core 11 is, for example, a metal foil containing at least aluminum, and is preferably an aluminum alloy foil containing aluminum as a main component (a component with the largest mass ratio) and containing at least one metal selected from iron, manganese, copper, magnesium, zirconium, silicon, chromium, titanium, and nickel. Among them, an aluminum alloy foil containing 1.2 to 1.7 mass % of iron (a content of aluminum is, for example, 98.3 to 98.8 mass %) is preferable.

A thickness of the core 11 is preferably 5 to 20 μm, and more preferably 8 to 15 μm. A softening temperature of the core 11 is preferably 130 to 200° C., and more preferably 150 to 190° C. The softening temperature of the core is a temperature at which metal particles grow with rise in temperature, a temperature at which an elongation rate of the core is doubled with respect to an elongation rate at ordinary temperature, and a temperature at which a tensile strength of the core is 80% or less of a tensile strength at ordinary temperature. The softening temperature of the core 11 within the above range allows the core to be included by the metal foil that softens at 200° C. or lower, and facilitates the softening of the core 11 in the heat-pressing step without melting of the fibrous binder 22. Although details will be described later, softening the core 11 accelerates embedding the positive electrode active material 21 in the core 11, and the positive electrode mixture sheet 12 is strongly joined to the core 11.

The positive electrode mixture sheet 12 is provided on the surface of the core 11 to constitute a mixture layer of the positive electrode 10. The positive electrode mixture sheet 12 includes the positive electrode active material 21 and the fibrous binder 22, and has a thickness of, for example, 30 to 120 μm, preferably 50 to 100 μm. By using the fibrous binder 22, the positive electrode mixture 20 can be rolled and formed into a sheet. The positive electrode mixture sheet 12 may include a non-fibrillated binder in addition to the fibrous binder 22.

In order to increase electron conductivity, the positive electrode mixture sheet 12 preferably includes a conductive agent 23. As the conductive agent 23, carbon materials such as carbon black, acetylene black, Ketjenblack, and graphite may be exemplified. A content of the conductive agent 23 is, for example, 0.5 to 5.0 mass % based on a mass of the positive electrode mixture sheet 12. An example of a median diameter (D50) on a volumetric basis of the conductive agent 23 is 0.05 to 1 μm.

The positive electrode mixture sheet 12 is constituted with the positive electrode active material 21 as a main component. A content of the positive electrode active material 21 is preferably 85 to 99 mass %, and more preferably 90 to 98 mass %, based on a mass of the positive electrode mixture sheet 12. A D50 of the positive electrode active material 21 is, for example, 1 to 30 μm, preferably 2 to 15 μm, and more preferably 3 to 15 jun. The D50 of the positive electrode active material 21 and the conductive agent 23 are measured by using a laser diffraction-type particle size distribution measuring device (LA-920, manufactured by HORIBA, Ltd.) with water as a dispersion medium.

For the positive electrode active material 21, a lithium-transition metal composite oxide is typically used. Examples of a metal element contained in the lithium-transition metal composite oxide include Ni, Co, Mn, Al, B, Mg, Ti, V, Cr, Fe, Cu, Zn, Ga, Sr, Zr, Nb, In, Sn, Ta, and W. Among them, at least one of Ni, Co, and Mn is preferably contained. An example of preferable composite oxides is a lithium-transition metal composite oxide containing Ni, Co, and Mn, or a lithium-transition metal composite oxide containing Ni, Co, and Al.

The fibrous binder 22 adheres to a particle surface of the positive electrode active material 21 to be intertwined with the positive electrode active material 21. In other words, the fibrous binder 22 present in a mesh shape holds the positive electrode active material 21. The conductive agent 23 is preferably not incorporated in the fibrous binder 22 but preferably adheres onto the particle surface of the positive electrode active material 21. A content of the fibrous binder 22 is, for example, 0.05 to 5.0 mass % based on a mass of the positive electrode mixture sheet 12.

The fibrous binder 22 has a higher melting point than a softening temperature of the core 11. The melting point of the fibrous binder 22 is higher than the softening temperature of the core 11 by preferably 50° C. or more and more preferably 100° C. or more. The fibrous binder 22 is constituted with, for example, a resin mainly composed of polytetrafluoroethylene (PTFE) having a melting point of 300° C. or higher. Since being easy to be fibrillated and having good adhesiveness to the positive electrode active material 21, PTFE is preferable as the binder of the positive electrode mixture sheet 12. The fibrous binder 22 may be constituted with substantially only PTFE, and may contain another component as long as the object of the present disclosure is not impaired.

As described above, the positive electrode mixture sheet 12 may include a binder that is not fibrillated (non-fibrous). Examples of the binder that is not fibrillated include polyvinylidene fluoride (PVdF). A melting point of PVdF, which is lower than the melting point of PTFE, is typically approximately 160° C. When the fibrous PTFE and the non-fibrous PVdF are used as the binder, an amount of PTFE added is preferably larger than an amount of PVdF added. Specifically, PTFE=1:0≤PVdF≤0.25 is preferable, and PTFE=1: 0≤PVdF≤0.20 is more preferable at a mass ratio.

When the positive electrode mixture sheet 12 includes PVdF, PVdF may melt depending on the temperature at which the stacked body of the core 11 and the positive electrode mixture sheet 12 is heat-pressed. Although the melting of PVdF contributes to strong joining between the particles included in the positive electrode mixture sheet 12 and between the positive electrode mixture sheet 12 and the core 11, the melted PVdF may cover the positive electrode active material to increase the electrode plate penetration resistance. However, the holding of the particles included in the positive electrode mixture sheet 12 is achieved basically by the fibrous binder 22 present in a mesh shape, and the joining between the positive electrode mixture sheet 12 and the core 11 can be achieved by an anchor effect of the core 11 to the positive electrode mixture sheet 12. Therefore, a small amount of the added PVdF that may be included in the positive electrode mixture sheet 12 is sufficient compared with an amount of the fibrous binder 22, and increase in the electrode plate penetration resistance may also be inhibited.

The positive electrode mixture sheet 12 may include substantially only the fibrous binder 22 (for example, the fibrous PTFE) as the binder.

In the positive electrode mixture sheet 12, a large amount of the binder that covers the particle surface of the positive electrode active material 21 by melting is preferably not present. The fibrous binder 22 is present in a state of a fiber via no melting step, and even when the binder such as PVdF is used in combination, only a small amount of PVdF is included compared with the fibrous binder 22. Thus, the binder does not inhibit contact between the positive electrode active material 21 and the electrolyte, and may keep low electrode plate penetration resistance.

As illustrated in FIG. 3, in the positive electrode 10, the positive electrode active material 21 is embedded in the core 11, and a maximum embedded depth D is 6.0 µm or longer. Here, the embedded depth of the positive electrode active material 21 means a length from the surface of the core 11 to a most embedded part of the positive electrode active material 21 along the thickness direction of the core 11. The embedded depth of the positive electrode active material 21 may be measured by observing a cross section of the positive electrode 10 using a scanning electron microscope (SEM).

The maximum embedded depth D of the positive electrode active material 21 is, as described above, at least 6.0 µm, and preferably 7.0 µm or longer. The maximum embedded depth D is, for example, preferably 30% or more and more preferably 40% or more of the thickness of the core 11. From the viewpoint of inhibition of foil break, an upper limit of the maximum embedded depth D is preferably 55% or less of the thickness of the core 11. A large amount of the positive electrode active material 21 contacting with the core 11 are preferably embedded in the core 11. For example, 50% or more of the positive electrode active material 21 contacting with the core 11 are embedded in the core 11.

The maximum embedded depth is evaluated by observing a cross section of the positive electrode using an SEM within a range of 0.25 mm in length along the core surface, and measuring a length of a most deeply embedded positive electrode active material from the core surface to the deepest part along the thickness direction of the core to specify this length as the maximum embedded depth. The cross section of the positive electrode may also be evaluated by observing a range of 0.06 mm at four points, and measuring a length of a most deeply embedded positive electrode active material from the core surface to the deepest part along the thickness direction of the core to specify this length as the maximum embedded depth.

The maximum embedded depth D of the positive electrode active material 21 may be regulated with, for example, the softening temperature of the core 11, and a heating temperature and a pressing pressure in the heat-pressing step. The lower the softening temperature of the core 11 and the higher the heating temperature and the pressing pressure, the larger the maximum embedded depth D. In the positive electrode 10, since the positive electrode active material 21 is deeply embedded in the core 11 and a large amount of the positive electrode active material 21 are embedded in the core 11, a strong anchor effect is exhibited, resulting in the strong joining of the positive electrode mixture sheet 12 to the core 11. Therefore, a high peeling strength of the positive electrode mixture sheet 12 may be achieved. It is to be noted that a too high heating temperature of the heat-pressing causes melting of the fibrous binder 22, leading to increase in the electrode plate penetration resistance.

[Negative Electrode]

The negative electrode comprises: a core constituted with a metal foil; and a negative electrode mixture layer provided on a surface of the core. For the core of the negative electrode, a copper foil is typically used. For the negative electrode, a conventionally known electrode plate manufactured with the wet method may be used, and an electrode plate comprising a negative electrode mixture sheet manufactured with the dry method may be used. The negative electrode, which comprises the core constituted with the metal foil that softens at 200° C. or lower and a negative electrode mixture sheet joined to a surface of the core, may have the same constitution as the above positive electrode 10.

For the negative electrode active material, a carbon-based active material such as: a natural graphite such as flake graphite, massive graphite, and amorphous graphite; and an artificial graphite such as massive artificial graphite (MAG) and graphitized mesophase-carbon microbead (MCMB) is used, for example. For the negative electrode active material, a Si-based active material and the like that forms an alloy with lithium may also be used. Since the carbon-based active material has a higher electron conductivity than the positive electrode active material 21, the negative electrode may not include a conductive agent 23.

[Non-Aqueous Electrolyte Secondary Battery]

A non-aqueous electrolyte secondary battery of an example of an embodiment comprises: an electrode assembly in which the above positive electrode 10 and the negative electrode are stacked with a separator interposed therebetween; a non-aqueous electrolyte; and an exterior housing body housing them. The electrode assembly may be any of a wound-type electrode assembly and a stacked-type electrode assembly. Examples of the exterior housing body include a cylindrical exterior housing can, a rectangular exterior housing can, a coin-shaped exterior housing can, and an exterior housing can constituted with an aluminum laminated sheet.

The non-aqueous electrolyte includes a non-aqueous solvent and an electrolyte salt dissolved in the non-aqueous solvent. For the non-aqueous solvent, esters, ethers, nitriles, amides, a mixed solvent of two or more thereof, and the like are used, for example. The non-aqueous solvent may contain a halogen-substitute in which at least a part of hydrogens in these solvents is substituted with a halogen atom such as fluorine. For the electrolyte salt, a lithium salt such as $LiPF_6$ is used, for example. The electrolyte is not limited to a liquid electrolyte, and may be a solid electrolyte.

[Method of Manufacturing Electrode]

Hereinafter, a method of manufacturing the positive electrode 10 will be further described in detail. Although the method of manufacturing the positive electrode 10 will be described below, this manufacturing method may be applied to manufacture of the negative electrode in the same manner. In a case of the negative electrode, a negative electrode active material is used instead of the positive electrode active material.

As illustrated in FIG. 1(a), in the manufacturing step of the positive electrode 10, binder particles are added into a mixer 40 to apply a shear force for fibrillation. In the present embodiment, the positive electrode active material 21, the binder particles, and the conductive agent 23 are added into the mixer 40 to mix these materials with fibrillating the binder particles to produce the positive electrode mixture 20 (hereinafter, this step is referred to as "first step"). Next, as illustrated in FIG. 1(b), the positive electrode mixture 20 is rolled and formed into a sheet to produce the positive electrode mixture sheet 12 (hereinafter, this step is referred to as "second step"). This manufacturing step is a dry process for manufacturing the positive electrode 10 by using the positive electrode mixture 20 having a solid content concentration of substantially 100%.

The binder particles used in the first step are preferably particles of polytetrafluoroethylene (PTFE) having a melting point of 300° C.' or higher. In addition to the PTFE particles, PVdF and the like that are not fibrillated may be added. For the mixer 40, a conventionally known mechanically stirring mixer may be used, for example. Specific examples of a preferable mixer 40 include: a cutter mill, a pin mill, a beads mill, a fine particle composer (a machine that generates a shear force between a rotor having a special shape and rotating at a high speed inside a tank and an impact plate), which are machines that may apply a mechanical shear force; a granulator; a kneader such as a twin screw extruding kneader and a planetary mixer. Among them, a cutter mill, a fine particle composer, a granulator, and a twin screw extruding kneader are preferable.

In the second step, the positive electrode mixture 20 is rolled and formed into a sheet by using two rolls 30. The two rolls 30 are disposed with a predetermined gap, and rotate in the same direction. The positive electrode mixture 20 is fed into the gap between the two rolls 30 to be compressed with the two rolls 30, to be stretched into a sheet. The obtained positive electrode mixture sheet 12 may be passed through the gap between the two rolls 30 a plurality of times, and may be stretched by using another roll having a different roll diameter, peripheral speed, gap, and the like one or more times. The roll may be heated to heat-press the positive electrode mixture sheet 12.

A thickness of the positive electrode mixture sheet 12 may be regulated with, for example, the gap between the two rolls 30, the peripheral speed, the number of the stretching treatment, and the like. In the second step, the positive electrode mixture 20 is preferably formed into a sheet by using two rolls 30 having peripheral speeds differing by a factor of two or more. Setting the peripheral speeds of the two rolls 30 to be different facilitates the thinning of the positive electrode mixture sheet 12 to improve the productivity, for example. The peripheral speed ratio of the two rolls 30 is preferably 2.5 or more, and may be 3 or more. The peripheral speed ratio of the two rolls 30 is, for example, 1:3.

Next, as illustrated in FIG. 2, the positive electrode mixture sheet 12 is laminated onto the core 11 to obtain the positive electrode 10 in which a mixture layer composed of the positive electrode mixture sheet 12 is provided on the surface of the core 11 (hereinafter, this step is referred to as "third step"). Although FIG. 2 illustrates a state where the positive electrode mixture sheet 12 is joined to only one surface of the core 11, the positive electrode mixture sheet 12 is preferably joined to both the surfaces of the core 11. The two positive electrode mixture sheets 12 may be joined to both the surfaces of the core 11 simultaneously. It is also acceptable that one sheet is joined to one surface of the core 11 and then another sheet is joined to the other surface.

In the third step, the positive electrode mixture sheet 12 is disposed on the surface of the core 11, and a stacked body of the core 11 and the positive electrode mixture sheet 12 is heat-pressed by using two rolls 31 at a temperature equal to or lower than the melting point of the binder to laminate the positive electrode mixture sheet 12 onto the surface of the core 11. The two rolls 31 are disposed, for example, with a predetermined gap, and rotate in the same direction at the same peripheral speed. At least one of the two rolls 31 is heated to a predetermined temperature with a heater. A linear pressure of the pressing is, for example, 0.2 [t/cm] to 5.0 [t/cm].

The heat-pressing is preferably performed at a temperature equal to or lower than the melting point of the fibrous binder 22. In this case, since the fibrous binder 22 does not melt, the fibrous shape of the binder may be maintained to keep the low electrode plate penetration resistance. The heat-pressing is preferably performed at a temperature lower than the melting point of the fibrous binder 22 by 50° C. or more, and more preferably performed at a temperature lower than the melting point of the fibrous binder 22 by 100° C. or more.

In addition, the heat-pressing is preferably performed by using a metal foil that softens at 200° C. or lower, at a temperature equal to or higher than the softening temperature of the core 11 and a temperature equal to or lower than the melting point of the fibrous binder 22. Setting the temperature of the heat-pressing to be equal to or higher than the softening temperature of the core 11 accelerates embedding the positive electrode active material 21 in the core 11 to further improve the peeling strength of the positive electrode mixture sheet 12. Also, in this case, the heat-pressing is preferably performed at a temperature lower than the melting point of the fibrous binder 22 by 50° C. or more, and more preferably performed at a temperature lower than the melting point of the fibrous binder 22 by 100° C. or more.

When the fibrous binder 22 and a particulate binder such as PVdF are used in combination, the heat-pressing is preferably performed at a temperature equal to or lower than melting points of all the binders. In this case, since the binders do not melt, shapes of the binders (the fibrous shape and the particulate shape) may be maintained to keep the low electrode plate penetration resistance.

In the third step, an aluminum alloy foil that contains 1.2 to 1.7 mass % of iron and softens at 150 to 190° C. is used as the core 11, for example, and a temperature of the roll 31 is set to a temperature equal to or lower than 200° C. to perform the heat-pressing. In this case, an example of the set temperature of the roll 31 is 130 to 200° C., and preferably changed depending on the melting point of the binder contained in the positive electrode mixture sheet 12. For example, the temperature of the roll 31 is set to be 145 to 155° C. when PTFE and PVdF are used as the binder, and set to be 190 to 200° C. when only PTFE is used.

The positive electrode 10 manufactured via the above steps has a low electrode plate penetration resistance and a high peeling strength, as demonstrated in the following Examples.

EXAMPLES

Hereinafter, the present disclosure will be further described with Examples, but the present disclosure is not limited to these Examples.

Example 1

[Production of Positive Electrode Mixture]

A positive electrode active material, PTFE particles, and acetylene black were mixed at a mass ratio of 100:4.0:0.9 by using a mixer (Wonder Crusher, manufactured by OSAKA CHEMICAL Co., Ltd.). This mixing treatment yielded a positive electrode mixture in which the PTFE particles were fibrillated, and the active material, the fibrous PTFE, and acetylene black were uniformly dispersed. The obtained positive electrode mixture had a solid content concentration of 100%.

[Production of Positive Electrode Mixture Sheet]

The obtained positive electrode mixture was rolled by passing between two rolls to produce a positive electrode mixture sheet. A peripheral speed ratio of the two rolls was set to be 1:3, and the stretching treatment was performed a plurality of times to regulate a thickness of the positive electrode mixture sheet to be 130 μm.

[Production of Positive Electrode]

The obtained positive electrode mixture sheet was disposed on a surface of a core, and a stacked body of the positive electrode mixture sheet and the core was heat-pressed by using two rolls heated to 150° C. (pressing pressure: 2.0 [t/cm]). This heat-pressing yielded a positive electrode in which the positive electrode active material was embedded in the core and the positive electrode mixture sheet was strongly joined to the surface of the core. Used for the core was an aluminum alloy foil having an iron content of 1.2 to 1.7 mass %, a softening temperature of 170° C., and a thickness of 15 μm.

On the obtained positive electrode, a maximum embedded depth of the positive electrode active material in the core, an electrode plate penetration resistance, and a peeling strength of the positive electrode mixture sheet were evaluated with the following methods. Table 1 shows the evaluation results together with a type of the binder used, a temperature at which the core softens (softening temperature), and a temperature of the heat-pressing.

[Evaluation of Maximum Embedded Depth]

A cross section of the positive electrode was observed by using an SEM within a range of 0.25 mm in length along the core surface, and a length of the most deeply embedded positive electrode active material from the core surface to the deepest part along the thickness direction of the core was measured to specify this length as the maximum embedded depth.

[Evaluation of Electrode Plate Penetration Resistance]

The positive electrode core in which the positive electrode mixture sheet was joined to only one surface was cut in a tab-attached shape so that the positive electrode mixture sheet was 20 mm×20 mm. Two of the positive electrodes were stacked so that the positive electrode mixture sheets were opposite to each other, sandwiched with two Cu plates on upper and lower sides, and pressed at 5 MPa. An electrode plate penetration resistance through the two tabs of the positive electrodes and the Cu plates on the upper and lower sides was measured with a direct-current four-probe method.

[Evaluation of Peeling Strength]

(1) The positive electrode was fixed on a stand in a state where the core side was directed to the stand side.

(2) A part of the positive electrode mixture sheet was peeled from the fixed positive electrode to be bent at 90° with respect to the core.

(3) The 90°-bent positive electrode mixture sheet was drawn by using a universal tester, and a force required to peel the sheet was measured to specify this force as the peeling strength.

Example 2

A positive electrode was produced to perform the above performance evaluations in the same manner as in Example 1 except that PVdF was used as the binder in addition to PTFE. A mass ratio of the positive electrode active material, PTFE, PVdF, and acetylene black was set to be 100:4.0:0.8:0.9.

Example 3

A positive electrode was produced to perform the above performance evaluations in the same manner as in Example 1 except that the temperature of the heat-pressing was changed to 150° C.

Comparative Example 1

A positive electrode was produced to perform the above performance evaluations in the same manner as in Example 1 except that an aluminum alloy having a softening temperature of 270° C. was used as the core.

TABLE 1

| | Binder | Softening point of core (° C.) | Temperature of heat-pressing (° C.) | Maximum embedded depth (μm) | Electrode plate penetration resistance (Ω) | Peeling strength (N/m) |
|---|---|---|---|---|---|---|
| Comparative Example 1 | PTFE | 270 | 200 | — | — | — |
| Example 2 | PTFE + PVdF | 170 | 200 | 7.100 | 1.108 | 79.1 |
| Example 3 | PTFE | 170 | 150 | 4.700 | 0.761 | 45.8 |
| Example 4 | PTFE + PVdF | 170 | 150 | 4.800 | 0.721 | 52.0 |
| Example 1 | PTFE | 170 | 200 | 7.021 | 0.596 | 59.7 |

From the evaluation results shown in Table 1, any of the positive electrodes of Examples are found to achieve both of the low electrode plate penetration resistance and the high peeling strength of the positive electrode mixture sheet. In the positive electrode of Comparative Example 1, the positive electrode mixture sheet may not be joined to the core surface. That is, the cores in Examples may achieve both of the exhibition of the anchor effect of the core and the inhibition of PTFE melting. In contrast, the positive electrode of Comparative Example 1, which was heat-pressed at the same temperature as in the positive electrode of Example 1, may not achieve both of the exhibition of the anchor effect of the core and the inhibition of PTFE melting.

The positive electrodes of Example 1 and Example 2 had higher peeling strengths than the positive electrodes of Example 3 and Example 4. It is considered that, in Example 1 and Example 2, the temperature of the heat-pressing is higher than that in Example 3 and Example 4, and the anchor effect of the core to the positive electrode mixture sheet may be sufficiently exhibited.

In the positive electrodes of Examples, no melting of the fibrous binder was observed. In addition, the positive electrode active material was observed to be deeply embedded in the core. In this case, it is considered that a strong anchor effect is exhibited, resulting in strong joining of the positive electrode mixture sheet to the core. In particular, Example 1 gave a good result.

REFERENCE SIGNS LIST

10 Positive electrode
11 Core
12 Positive electrode mixture sheet
20 Positive electrode mixture
21 Positive electrode active material
22 Fibrous binder
23 Conductive agent
30, 31 Roll
40 Mixer

The invention claimed is:

1. An electrode for a secondary battery, comprising:
   a core constituted with a metal foil that softens at 200° C. or lower; and
   an electrode mixture sheet joined to a surface of the core, wherein
   the electrode mixture sheet includes an active material and a fibrous binder, and
   the active material is embedded in the core and a maximum embedded depth is 30% or more of a thickness of the core.

2. The electrode for a secondary battery according to claim 1, wherein the fibrous binder is mainly composed of polytetrafluoroethylene.

3. The electrode for a secondary battery according to claim 1, wherein the core is an aluminum alloy foil containing 1.2 to 1.7 mass % of iron.

4. The electrode for a secondary battery according to claim 1, wherein a melting point of the fibrous binder is higher than a softening point of the core by 100° C. or more.

* * * * *